(12) United States Patent
Kao

(10) Patent No.: US 6,721,074 B1
(45) Date of Patent: Apr. 13, 2004

(54) DOUBLE SIDE SCANNER MODULE

(75) Inventor: Will Kao, Hsinchu (TW)

(73) Assignee: Mustek Systems Inc. (TW)

( * ) Notice: Subject to any disclaimer, the term of this patent is extended or adjusted under 35 U.S.C. 154(b) by 0 days.

(21) Appl. No.: 09/311,600

(22) Filed: May 13, 1999

(51) Int. Cl.[7] .............................................. H04N 1/04
(52) U.S. Cl. ...................... 358/496; 358/498; 358/408; 358/493; 271/160; 399/367; 399/364
(58) Field of Search ................................. 358/497, 498, 358/496, 404, 474, 408, 493; 382/313; 271/160; 399/367, 364, 374, 365

(56) References Cited

U.S. PATENT DOCUMENTS

| | | | | |
|---|---|---|---|---|
| 4,743,974 A | * | 5/1988 | Lockwood ................... | 358/285 |
| 4,975,749 A | * | 12/1990 | Tsunoda ..................... | 355/320 |
| 5,298,937 A | * | 3/1994 | Telle ........................... | 355/23 |
| 5,339,139 A | * | 8/1994 | Fullerton et al. ........... | 399/203 |
| 5,463,451 A | * | 10/1995 | Acquaviva et al. ......... | 399/211 |
| 5,610,731 A | * | 3/1997 | Itoh ............................. | 358/49 |
| 5,619,343 A | * | 4/1997 | Amemiya ................... | 358/408 |
| 5,689,792 A | * | 11/1997 | Acquaviva et al. ......... | 399/365 |
| 5,812,279 A | * | 9/1998 | Fukushima ................. | 358/404 |
| 5,943,451 A | * | 8/1999 | Lee ............................. | 382/313 |

* cited by examiner

Primary Examiner—Kimberly Williams
Assistant Examiner—Negussie Worku
(74) Attorney, Agent, or Firm—Lowe Hauptman Gilman & Berner, LLP

(57) ABSTRACT

A double side scanner module which consists of a U-shaped inversion device and two image information reading devices is provided for reading images on the two sides of an original in a single pass. The U-shaped inversion device has two ends for providing a paper feeding path and a paper output path respectively. The two ends are at the same side for the convenience of operation. At both of the two ends, there is a glass window. Beneath each of the glass windows, there is an image information reading device. When an original is fed into the paper feeding end and conveyed through the first glass window, the first image information reading device starts to read the image on the first side of the original. When the original is conveyed through the U-shaped inversion device, the scanned side will be inverted to the other side. Consequently, when the original is conveyed through the second glass window, the second image information reading device can read the image on the second side of the original and complete the double side scanning.

8 Claims, 4 Drawing Sheets

DOUBLE SIDE SCANNER MODULE

BACKGROUND OF THE INVENTION

A. Field of the Invention

The present invention relates to a double side scanner module, especially to a scanner module consisting of a U-shaped inversion device, and two image information reading devices, thereby to read the images on both sides of an original in a single pass.

B. Description of the Prior Art

A conventional scanner or facsimile machine can only scan one side of an original. If a user wants to scan two sides of an original, he has to manually turn over the original to the other side and scan the original once again. To provide a scanner with the functions of double side scanning, an U.S. Pat. No. 4,743,974, "Dual Scanning Array Raster Input Scanner" by Dan F. Lockwood disclosed a scanner which uses two Charge Coupled Devices (CCD) disposed face to face so as to read the images on the two sides of an original in a single pass.

Refer to FIG. 1, two CCDs 11, 12 are located face to face with two pieces of glass windows 13a, 13b interposed therebetween. The structure as illustrated in FIG. 1 is a multi-mode scanner. In a first mode, if the user only wants to scan one side of an original, he may put the original on the sheet table 15. Then, the lower CCD 12 will be driven by the guiding shaft 14 to move along the sheet table 15 and progressively read the entire image of the original. In a second mode, if the user wants to scan both sides of an original, the original will be conveyed by the roller set 16 to pass through the two glass windows 13a, 13b. Consequently, the two CCDs 11, 12 can almost simultaneously read the images on the two sides of an original.

In practice, it would be difficult for the invention of Lockwood to avoid the shadows caused by the fluorescent light emitted from the two face-to-face CCDs 11, 12 even though Lockwood taught that the two CCDs 11, 12 shall be arranged biased with an offset. For one thing, since the two CCDs 11, 12 read the image information almost simultaneously, they cannot be located far apart. In other words, they must be arranged closely enough to be able to read the entire page without missing the image on the front end or the lower end. In that case, the fluorescent light emitted by the two CCDs 11, 12 is so strong that the shadow effects can hardly be avoided according to the structure as illustrated in FIG. 1. Moreover, the scanner module of Lockwood is too complicated to be implemented inside a small image reading apparatus, such as a scanner or a facsimile machine.

SUMMARY OF THE INVENTION

Accordingly, it is an object of the present invention to provide a double side scanner module which is simple in structure and small in size, so as to read the images on the two sides of an original, thereby to improve the efficiency of image reading.

It is another object of the present invention to provide a scanner module which can be adapted to various still image reading apparatus, such as a facsimile machine and a scanner, so as to improve the efficiency of image reading.

In accordance with the present invention, a scanner module characterized in the U-shaped inversion device and two image information reading devices is provided for reading images on the two sides of an original in a single pass. The U-shaped inversion device has two ends for providing a paper feeding path and a paper output path respectively. The two ends are at the same side for the convenience of operation. At each of the paper feeding path and the paper output path, there is a glass window for an original to pass through. Beneath each of the glass windows, there is an image information reading device. When an original is fed into the paper feeding path and conveyed through the first glass window, the first image information reading device starts to read the image on the first side of the original. When the original is conveyed through the U-shaped inversion device, the scanned side will be inverted to the other side. Consequently, when the original is conveyed through the second glass window, the second image information reading device can read the image on the second side of the original and complete the image reading on both sides of an original. Since the inventive scanner module is small in size, so it can be easily adapted to a scanner or a facsimile machine to read the images on both sides of an original in a single pass, thereby to improve the efficiency of image reading. Moreover, the inventive module is simple in structure, so the manufacture cost can be remarkably reduced. More importantly, since the two image information reading devices are not disposed face-to-face, the shadows can be successfully avoided.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
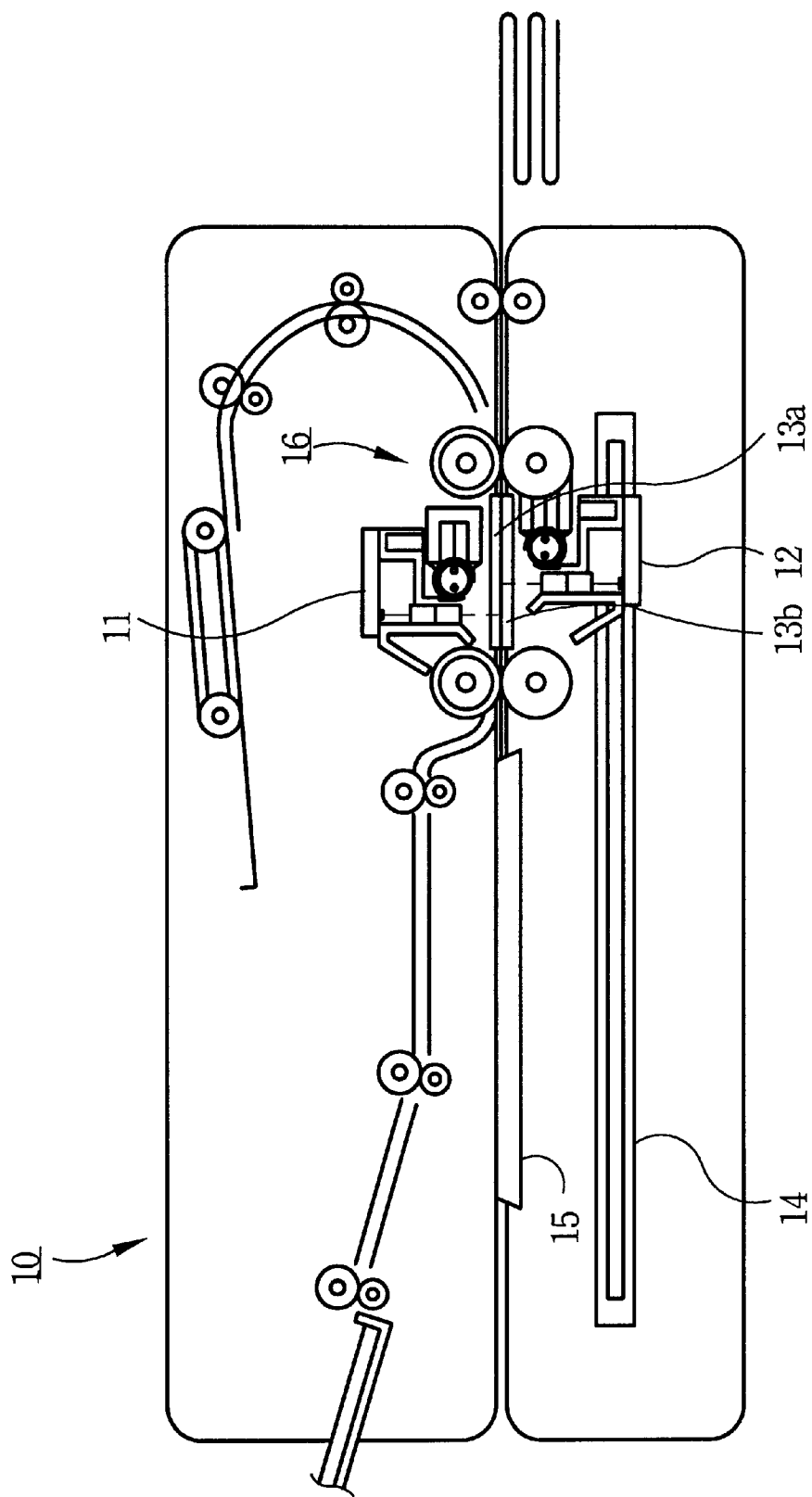
FIG. 1 is a sectional side view schematically showing the structure of a conventional scanner.
Figure 2:
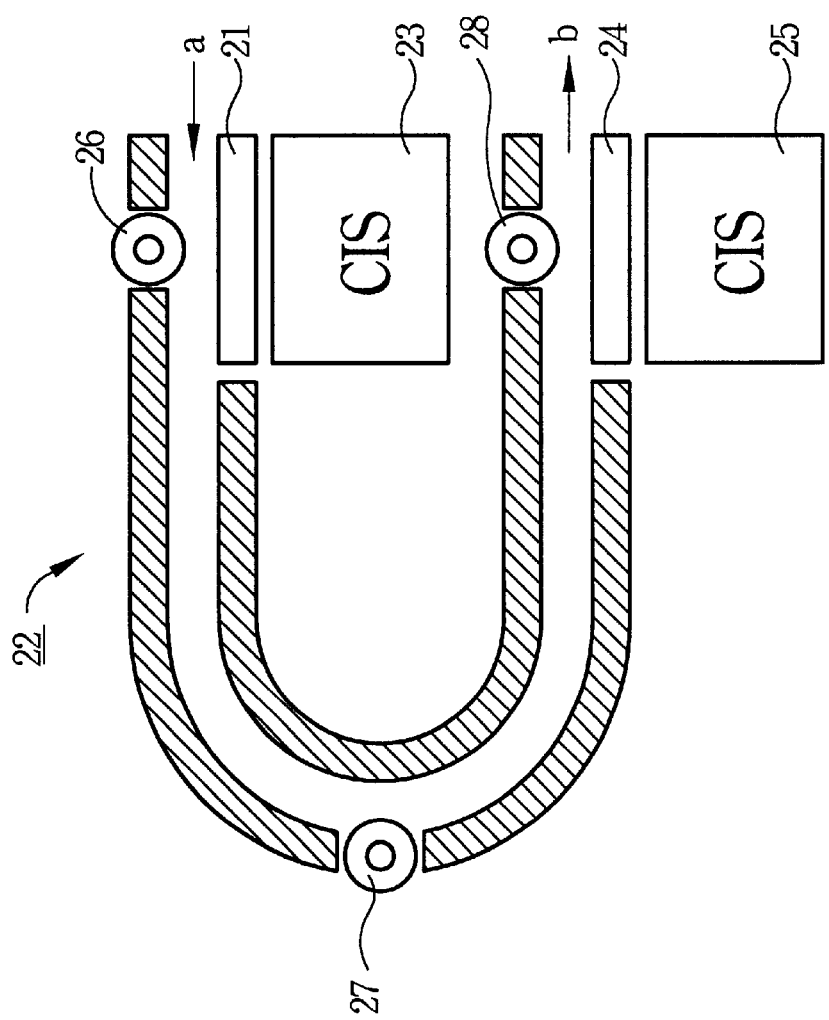
FIG. 2 is a sectional side view schematically showing the structure of the double side scanner module according to a preferred embodiment of the present invention.

To solve the problems and achieve the objects mentioned above, the present invention uses a U-shaped inversion device and two independent image information reading devices for reading images on both sides of an original. The preferred embodiment of the present invention is illustrated in FIG. 2. It mainly consists of a U-shaped inversion device 22, a first glass window 21, a first contact image sensor module 23, a second glass window 24, and a second contact image sensor module 25.

Refer to FIG. 2, when scanning, an original is fed into the paper feeding path of the U-shaped inversion device 22 from direction a, and then conveyed by a pinch roller 26 to pass through the first glass window 21. The contact image sensor module 23 is fixed beneath the glass window 21 to read the image on the first side of the original. Inside the U-shaped inversion device 22, there is at least a roller 27 for guiding the original from a paper feeding path to a paper output path in direction b.

The paper feeding path and the paper output path are at the same side, so as to reduce the size of the housing and make the operation more easily. The contact image sensor module 23, 25 can also be replaced with a Charge Coupled Device (CCD), as illustrated in FIG. 3.

Figure 3:
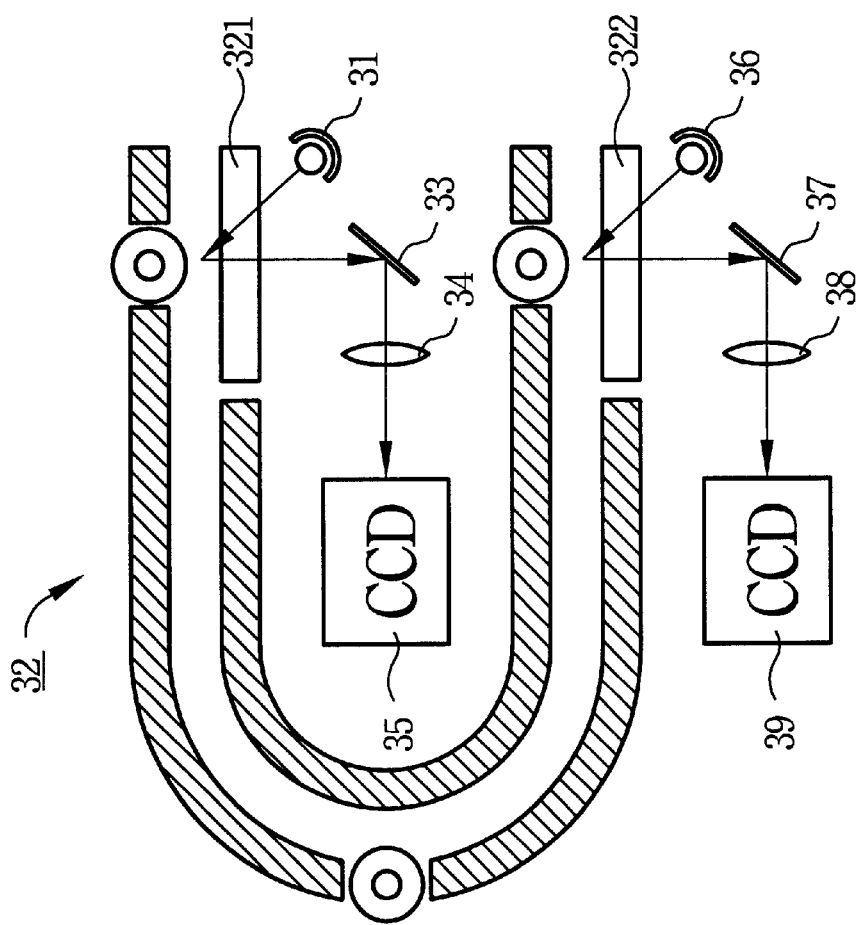
FIG. 3 is a sectional side view schematically showing the structure of the double side scanner module according to another preferred embodiment of the present invention.

Refer to FIG. 3, the U-shaped inversion device 32 is the same as that of FIG. 2. The only difference is that the contact image sensor module is replaced with a CCD. Accordingly, beneath the glass window 321, 322, CCDs 35, 39 are installed with light sources 31, 36, mirrors 33, 37, and lenses 34, 38. The light sources 31, 36, such as fluorescent lamps, emit light onto the glass windows 321, 322 to read an image of an original passing therethrough. The mirrors 33, 37 guide the reflected image to the CCDs 35, 39 via lenses 34, 38 for the CCDs 35, 39 to read the image of an original.

Figure 4:
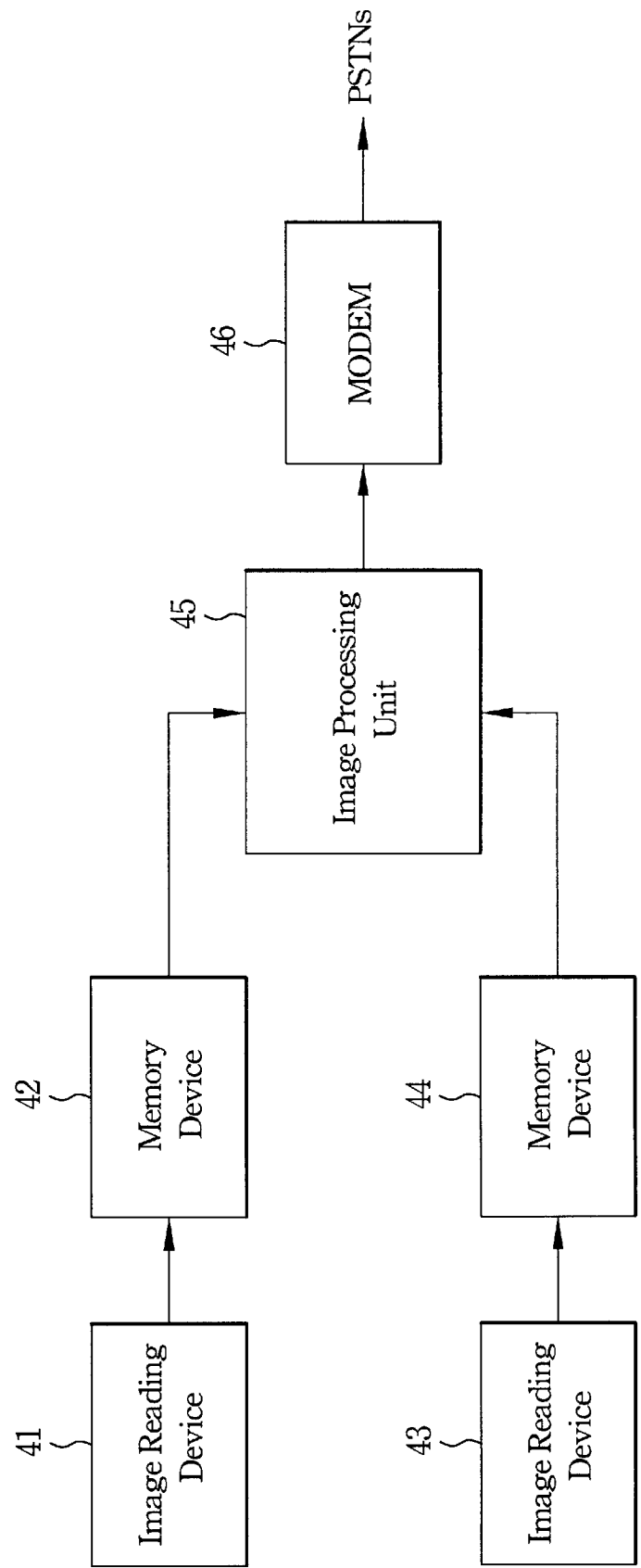
FIG. 4 is a functional block diagram showing the structure when the inventive module is adapted to a facsimile machine.

On the other hand, since the inventive scanner module is small in size and simple in structure, so it can be easily adapted to a scanner or a facsimile machine to provide the function of double-side scanning. Refer to FIG. 4 for showing the structure that the inventive module is adapted to a facsimile machine. As illustrated in FIG. 4, the image information reading devices 41, 43 are coupled to memory devices 42, 44 respectively for temporarily storing image data in the memory devices 42, 44. The image processing unit 45 reads the image data stored in the memory devices 42, 44 according to a predetermined order and then convert the image data into digital signals to be transferred to a Modulation/Demodulation module (MODEM) 46. The MODEM 46 is connected to a Public Switch Telephone Networks for transferring the digitized image data to a remote site.

To sum up, the inventive scanner module is simple in structure, low in cost and adaptable to various scanner devices. More importantly, it can improve the scanning efficiency by reading the images on both sides of an original in a single pass. Moreover, since the image information reading devices of the present invention are not disposed face-to-face, therefore the shadow effects can be successfully avoided.

Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A double side scanner module comprising:

a U-shaped inversion means for turning an original from one side to the other side by guiding said original from a paper feeding path to a paper output path, wherein said paper feeding path is an inlet end of said U-shaped inversion means and said paper output path is a outlet end of said U-shaped inversion means;

a first glass window adjacent to said paper feeding path of said U-shaped inversion means;

a first image information reading means located beneath said first glass window for reading an image on the first side of said original while said original is fed into said paper feeding path and said original is driven progressively through said first glass window said first image information reading means scanning said original at said inlet end of said U-shaped inversion means;

a second glass window adjacent to said paper output path of said U-shaped inversion means; and a second image information reading means located beneath said second glass window for reading an image on the second side of said original while said original is inverted already by said U-shaped inversion means and said original is driven progressively through said second glass window, said second image information reading means scanning said original at said outlet end of said U-shaped inversion means, wherein the first image information reading means and the second image information reading means face toward to the same direction, in that case, the illumination caused by said second image information reading means projecting to the back of said first image information reading means, instead of projecting into said first image information reading means.

2. The module as claimed in claim 1, wherein said U-shaped inversion means comprises:

a plurality of rollers for guiding said original from said paper feeding path to said paper output path.

3. The module as claimed in claim 2, further comprising:

a first roller disposed against said first glass window; and a second roller disposed against said second glass window.

4. The module as claimed in claim 1, wherein said first image information reading means is a contact image sensor module.

5. The module as claimed in claim 1, wherein said second image information reading means is a contact image sensor module.

6. The module as claimed in claim 1, wherein said first image information reading means is a charge coupled device.

7. The module as claimed in claim 1, wherein said second image information reading means is a charge coupled device.

8. The module as claimed in claim 1, further comprising:

first memory means coupled to said first image information reading means for storing image data read by said first image information reading means;

second memory means coupled to said second image information reading means for storing image data read by said second image information reading means;

an image process unit for reading said image data stored in said first memory means and said image data stored in said second memory means according to a predetermined order, and converting said image data into digital signals; and a modulation/demodulation module coupled to said image process unit for transferring said digital signals to a telephone network.

* * * * *